United States Patent
Kibble-Smith et al.

(10) Patent No.: US 10,453,040 B1
(45) Date of Patent: Oct. 22, 2019

(54) SYSTEM AND METHOD FOR MAKING AND TRACKING GOVERNMENT-RELATED PAYMENTS IN A CROSS-JURISDICTION PAYMENT ENVIRONMENT

(71) Applicant: Government Payment Service, Inc., Indianapolis, IN (US)

(72) Inventors: Brian G. Kibble-Smith, Oak Park, IL (US); Jason Bybee, Pittsboro, IN (US); Bryan Holt, Franklin, IN (US); Jacob Briscoe, Greenwood, IN (US)

(73) Assignee: GOVERNMENT PAYMENT SERVICE, INC., Indianapolis, IN (US)

( * ) Notice: Subject to any disclaimer, the term of this patent is extended or adjusted under 35 U.S.C. 154(b) by 197 days.

(21) Appl. No.: 15/670,817

(22) Filed: Aug. 7, 2017

Related U.S. Application Data

(63) Continuation of application No. 14/215,112, filed on Mar. 17, 2014, now abandoned.

(60) Provisional application No. 61/786,891, filed on Mar. 15, 2013.

(51) Int. Cl.
G06Q 20/34 (2012.01)
G06Q 20/10 (2012.01)
G06Q 20/40 (2012.01)

(52) U.S. Cl.
CPC .......... *G06Q 20/102* (2013.01); *G06Q 20/34* (2013.01); *G06Q 20/401* (2013.01)

(58) Field of Classification Search
CPC .............................. G06Q 20/00; G06Q 20/34
USPC .......................................................... 705/40
See application file for complete search history.

(56) References Cited

U.S. PATENT DOCUMENTS

2004/0205533 A1* 10/2004 Lopata .................. G06F 17/243
715/226
2009/0281943 A1* 11/2009 Yoggerst ................ G06Q 20/04
705/39

* cited by examiner

*Primary Examiner* — Robert R Niquette
*Assistant Examiner* — Liz P Nguyen
(74) *Attorney, Agent, or Firm* — Patzik, Frank & Samotny Ltd.

(57) ABSTRACT

A computer-implemented method is provided for payment of financial obligations to a selected agency from a payment source including at least one of a credit card, a debit card, a prepaid debit card, a checking account, a brokerage account or an electronic payment. Payment is made through an agency computing device associated with any one of a plurality of participating agencies communicating with a transaction processor computer system via a communication network.

27 Claims, 13 Drawing Sheets

SYSTEM AND METHOD FOR MAKING AND TRACKING GOVERNMENT-RELATED PAYMENTS IN A CROSS-JURISDICTION PAYMENT ENVIRONMENT

CROSS REFERENCE TO RELATED APPLICATION

This application claims the benefit of U.S. Application Ser. No. 61/786,891, filed on Mar. 15, 2013, the disclosure of which is expressly incorporated herein by reference.

BACKGROUND AND SUMMARY OF THE DISCLOSURE

The present disclosure relates to a user-focused system and method of Government Payment Service, Inc., dba GovPayNet® ("GovPayNet") primarily used to enable constituents and remote users of government Agencies to more conveniently and expeditiously pay monies owed to a government office, department, quasi-government organization, or other public authority or entity ("Agency") in connection with exercising various rights, securing various privileges, and making various purchases, such as paying fees for goods, services, licenses and permits, the posting of cash bail, the payment of warrants, citations, fines, probation fees, electronic monitoring fees, enforced child support, and other public charges in connection with exercising various rights and satisfying various obligations using modern, electronic financial means ("Transaction").

The system and method of the present disclosure provides the ability for an Agency to provide an Internet payment environment for the acceptance of a credit card, debit card or prepaid debit card including but not limited to those issued by Visa, MasterCard, Discover, American Express, Diners, or JCB ("Card Associations"), or other method to electronically obtain funds from other financial service providers and accounts ("Payment Device") used by an individual ("Payment Device Holder"). The use of Payment Devices to make payments electronically, including over the Internet, is based in large part upon the information encoded upon the Payment Device ("Payment Device Data") being automatically accessed by GovPayNet and similar electronic Transaction processing companies. It is the ability to access Payment Device Data that enables the Payment Device Holder (usually a consumer but also potentially an employee using an organization's Payment Device) to perform a Transaction at any Agency participating in the system and method of the present disclosure regardless of the Agency to which the obligation is payable, as long as the payee Agency also uses the system and method.

Private businesses, not-for-profit organizations, and public or quasi-public entities that accept Payment Devices generally contract with a third-party entity in the business (such as GovPayNet) of providing the connectivity, technology and operational support necessary for the acceptance of Payment Devices ("Processing Company"). The system and method of an illustrated embodiment of the present disclosure enables the Processing Company to make the system and method available to all Agencies under contract with the Processing Company for accepting Transactions not only for their own benefit but on behalf of other Agencies participating in the system and method and to confirm whether an obligation owed to that Agency has been paid through the present system and method to another Agency where both Agencies participate in the system and method.

The present disclosure uses data processing, payment industry, telecommunications and wireless technologies to accept Payment Devices used by a Payment Device Holder at an Agency so that the Agency may facilitate the acceptance of payments for any other Agency for which the first Agency is willing to provide this service. This distinguishes it from other methods in which a Processing Company accepts Transactions on behalf of a variety of Agencies. Where the system and method is deployed, each Agency participating in the system may act as a cooperative access point for the processing of a payment intended for any other participating Agency. Also, any system-participating Agency may verify directly that a payment owed to that Agency has been satisfied even if made through another system-participating Agency. The system and method accomplishes this by software configured to allow a participating Agency to accept Payment Device Data for any other participating Agency and transmit it through a secure connection to the Processing Company's Transaction processing system. In this manner, the Processing Company establishes an "interoperable," secure, Internet-based, networked payment environment that multiplies the payment acceptance ability of any Agency by leveraging the facilities of all other participating Agencies.

GovPayNet processes Payment Device Data in full compliance with Payment Device Industry Data Security Standards, which are the rules promulgated and revised from time to time by the PCI Security Standards Council or such successor rules or organization that may be formed. There are also public sector laws and regulations requiring actions and imposing liability pertaining to a data breach involving Payment Device Data. There are other private sector security and operating requirements, plans, and programs applicable to Payment Device Data and Transactions, such as the rules and regulations governing entity participation in the Card Associations, as they may be amended from time to time ("Association Rules"). Collectively, these private sector and public sector provisions define an extensive, complex and evolving matrix of requirements that entities engaging in an electronic payment environment, such as the Internet, must meet in order to enable payments using Payment Devices and prevent the unintentional disclosure of Payment Device Data. The system and method of the present disclosure does not interfere with or compromise GovPayNet's ability to accept and handle Payment Device Data in full compliance with any data security standards or Association Rules.

It is anticipated that the system and method of the present disclosure will be used by groups of participating Agencies that have a motivation to cooperate. Examples include Agencies in a shared purchasing environment, typically regionally managed or Agencies that have other reason to cooperate such as local Agencies within a county, Agencies that share borders, Agencies that are "feeder" Agencies to other central Agencies, or other Agencies for which coordinated payment and confirmation of payment is in the Agencies' collective interests, as is often the case in state and local law enforcement. Although law enforcement Agencies routinely participate in shared offender data systems these efforts are still a work in progress in many respects.

In contrast, use of the system and method can provide real-time access to payment information immediately updated as Transactions are settled financially. This, of course, is not the same as instant access to criminal or other records, but the ability of Agencies to accept payments through the system and method is accompanied by the ability to verify that payments have been made through a cooperating Agency on a real-time basis is an advantage over accessing court records that may not be updated as quickly.

The system and method of the present disclosure would also have applicability in a situation in which a participating Agency's or Agencies' ability to accept Transactions is compromised by a manmade or natural disaster. In such circumstances, displaced constituents of any affected Agency may be permitted to continue to satisfy their financial obligations to local government by acting through other participating Agencies; for example, residents of one coastal city who have evacuated to another nearby city. Additionally, as individual networks of participating Agencies using the system and method expand, opportunities will grow for user networks in proximity with other user networks to become connected into even larger networks, for the benefit of all system stakeholders.

Additional features of the present system will become apparent to those skilled in the art upon consideration of the following detailed description of illustrative embodiments exemplifying the best mode of carrying out the present system as presently perceived.

BRIEF DESCRIPTION OF THE DRAWINGS

The foregoing aspects and other features of this present system will become more readily appreciated and better understood by reference to the following detailed description when taken in conjunction with the accompanying drawings in which:

FIG. 8 is a screen shot depicting the web page where the user will enter payment information;

FIG. 9 is a screen shot depicting the confirmation process the user will complete regarding payment information;

FIG. 10 is a screen shot depicting the specific payment amount entry process the user will complete;

FIG. 11 is a screen shot depicting the card information that the user must supply;

FIG. 12 is a screen shot depicting the confirmation of a successful payment that will be displayed to the user; and FIG. 13 is a screen shot depicting a confirmation of payment that the user may print to conclude use of the system and method of the present disclosure.

DETAILED DESCRIPTION OF THE DRAWINGS

Figure 1:
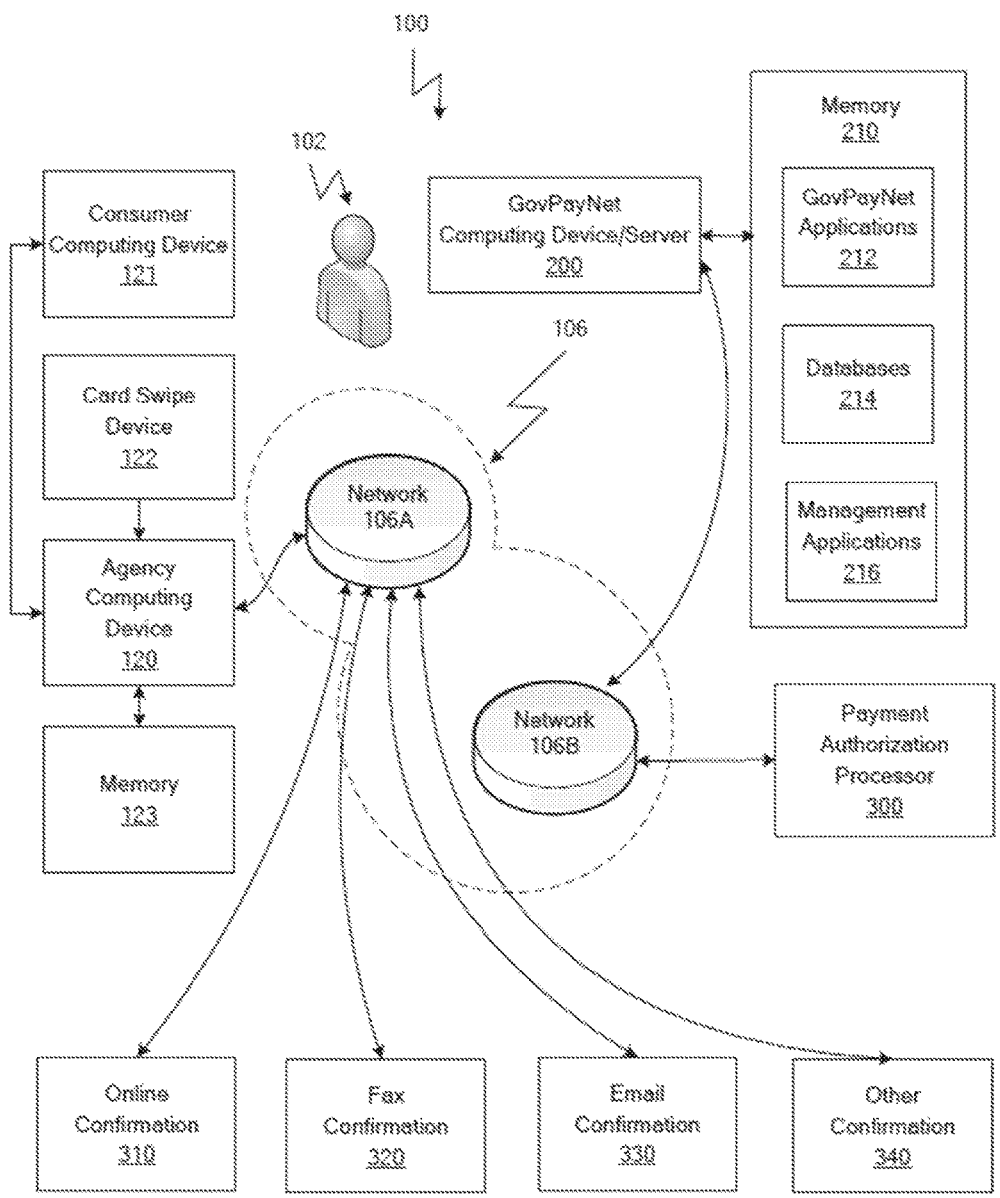
FIG. 1 is a block diagram illustrating components of the Agency computing device and its interaction with the GovPayNet computing device and associated elements of the payment process in which the system and method of the present disclosure operates.

For the purposes of promoting an understanding of the principles of the present disclosure, reference will now be made to the embodiments illustrated in the drawings, which are described below. The embodiments disclosed below are not intended to be exhaustive or limit the present system to the precise form disclosed in the following detailed description. Rather, the embodiments are chosen and described so that others skilled in the art may utilize their teachings. Therefore, no limitation of the scope of the claimed present system is thereby intended. The present system includes any alterations and further modifications of the illustrated devices and described methods and further applications of the principles of the present system which would normally occur to one skilled in the art to which the present system relates. Corresponding reference characters indicate corresponding parts throughout the several views.

This application refers to U.S. patent application Ser. No. 12/982,500, filed on Dec. 30, 2010, titled "System and Method for Managing Incarcerated Populations through Automated Pretrial Release Services Including Electronic Bail, Fine and Fee Payment", which is expressly incorporated by reference herein. Certain systems and methods utilized in application Ser. No. 12/982,500 are relevant or supplemental to the system and method described herein.

FIG. 1 illustrates a system 100 in which an Agency computing device 120 communicates with a GovPayNet computing device 200 through an electronic communication network 106A. Agency computing device 120 may be accessed by a user 102, presumed to be an Agency employee, through a plurality of other computing devices, labeled collectively as remote computing device 121. Exemplary remote computing devices include a personal data assistant ("PDA"), cellular device such as smart phone, tablet computer, or other device capable of the communications discussed herein. Agency computing device 120 may be a general purpose computer or a portable computing device such as a laptop computer. Although Agency computing device 120 is illustrated as a single computing device, multiple computing devices may be used together, such as over a network or other methods of transferring data. Agency computing device 120 accesses a memory 123 as further described in FIG. 2.

Figure 2:
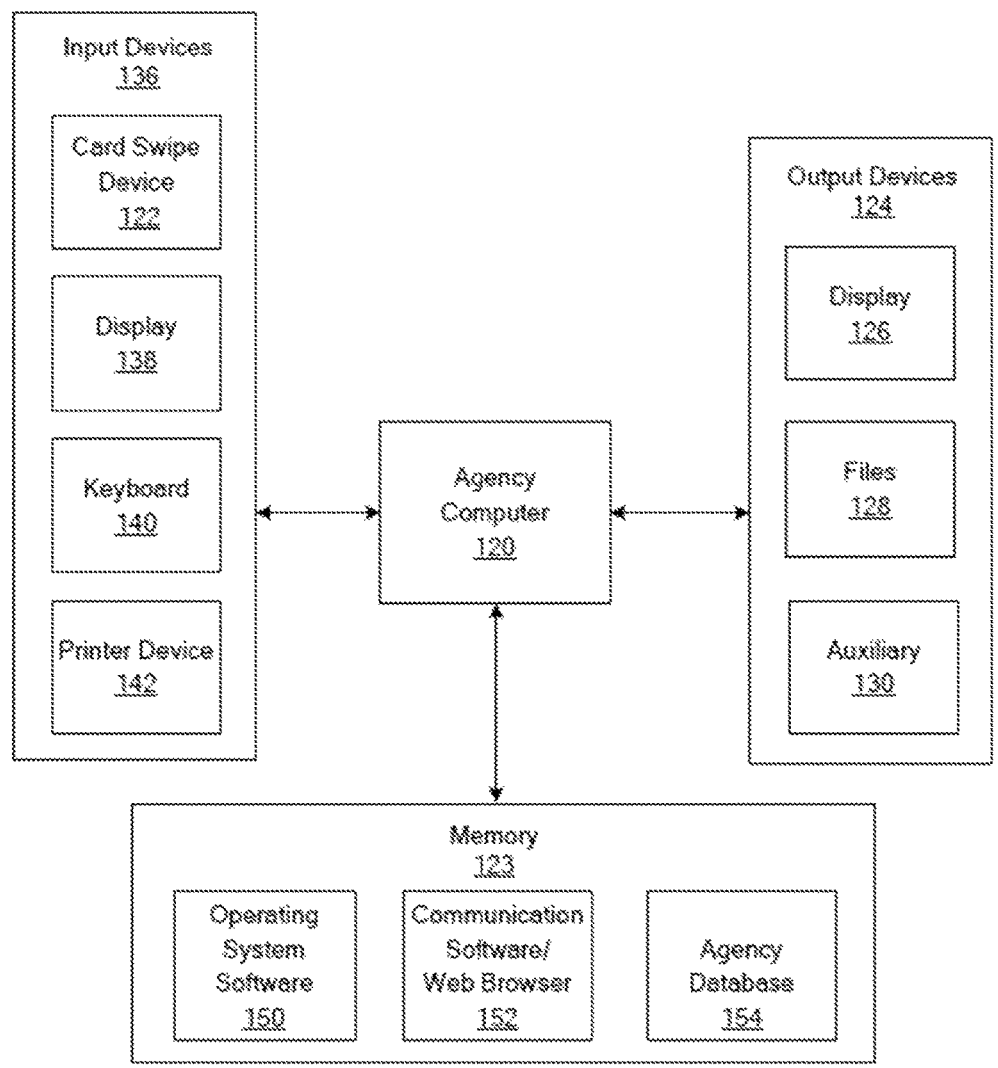
FIG. 2 illustrates an Agency computing device coupled to a memory and a plurality of input and output devices.

As shown in FIG. 2, memory 123 to which Agency computing device 120 has access is a computer readable medium and may be a single storage device or multiple storage devices, located either locally with Agency computing device 120 or accessible across a network. By way of example, and not limitation, computer-readable media may comprise computer storage media. Exemplary computer storage media includes, but is not limited to, RAM, ROM, EEPROM, flash memory or other memory technology, CD-ROM, Digital Versatile Disk ("DVD") or other optical disk storage, magnetic cassettes, magnetic tape, magnetic disk storage or other magnetic storage devices, or any other medium which can be used to store information and which can be accessed by Agency computing device 120 including remote storage devices or cloud storage devices.

Agency computing device 120 also has access to one or more output devices 124. Exemplary output devices 124 include a display 126, files 128, and an auxiliary device 130. Exemplary auxiliary devices 130 include devices which may be coupled to Agency computing device 120, such as a printer. Files 128 may have various formats. In one embodiment, files 128 are formatted for display by an Internet browser, and may include one or more of HyperText Markup Language ("HTML"), or other formatting instructions. In one embodiment, files 128 are files stored in memory 123 for transmission to another computing device and eventual presentation by another output device or at least to influence information provided by the other output device.

Agency computing device 120 also has access to one or more input devices 136. Exemplary input devices 136 include card swipe device 122, display 138 (such as a touch display), keyboard 140 (such as a standard keyboard or a keypad), a pointer device (such as a mouse, a roller ball, a stylus), and other suitable devices by which an operator may provide input to Agency computing device 120. Card swipe device 122, as more thoroughly explained in application Ser. No. 12/982,500, emulates the function of an Agency keyboard 140 by reading cardholder data from the magnetic stripe on the back of a standard credit card or debit card and, through the use of software proprietary to GovPayNet, populating data fields required to be completed to process a Transaction with billing information accessed from the card's magnetic stripe more accurately and efficiently than by manual means (reference is made to application Ser. No. 12/982,500 for further discussion of the functions and role of card swipe device 122). As more particularly described in application Ser. No. 12/982,500, this system and method is also available to the Payment Device Holder for making a payment at the scene of an event, such as the time and place of a traffic infraction.

Memory 123 includes operating system software 150, communications software 152, and an Agency database 154. Exemplary communications software 152 includes e-mail software, Internet browser software, file sharing software and other types of software which permit Agency computing device 120 to communicate with other computing devices across a public switched network 106A. An exemplary public switched network is the Internet.

Referring to FIG. 1, Agency user 102 is shown as associated with the Agency computing device 120, remote computing device 121 and card swipe device 122. A given user 102 may have multiple computing devices categorized under remote computing device 121 through which user 102 may access Agency computing device 120, as illustrated, through network 106A. For example, Agency computing device 120 is a computer system with which user 102 can communicate through a communication network 106A which is illustratively a public switched network, such as the Internet. Access to network 106A may also be enabled by an intermediary network, in that the provider of cellular service provides a connection to the Internet. For purposes of the present disclosure, illustrating all types of networks within network 106A through which user 102 may communicate, directly and indirectly, with Agency computing device 120 is not necessary.

GovPayNet computing device 200 is labeled as "Computing Device/Server" because it serves or otherwise makes available various applications, information, products or services. In one embodiment, GovPayNet computing device 200 is a web server and the various applications are web sites which are served by computing device 200. Although a single server 200 is shown, it is understood that multiple computing devices are often implemented to function as the illustrated server 200.

GovPayNet computing device 200 has access to a memory 210. Memory 210 is a computer readable medium and may be a single storage device or multiple storage devices, located either locally with GovPayNet computing device 200 or accessible across a network 106. Computer-readable media may be any available media that can be accessed by GovPayNet computing device 200 and includes both volatile and non-volatile media. Further, computer readable-media may be one or both of removable and non-removable media. By way of example, and not limitation, computer-readable media may comprise computer storage media. Exemplary computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store information and which can be accessed by GovPayNet computing device 200 including remote storage devices or cloud storage devices.

In addition to one or more GovPayNet applications 212, memory 210 stores one or more databases 214 which are used by the GovPayNet applications 212. Memory 210 also includes an account or access management applications 216. Memory 210 further includes communications software. Exemplary communications software include e-mail software, web server software, and other types of software which permit GovPayNet computing device 200 to communicate with Agency computing device 120 across network 106A. Communication also occurs between the GovPayNet computing device 200 and any other suitable other network 106B including private networks. Exemplary other suitable networks 106B include Card Association processing networks and the electronic funds transfer ("EFT") network used by the banking industry for online debit transactions, such as point-of-sale ("POS") and automated teller machine networks.

As shown in FIG. 1, the present disclosure can involve use of a card swipe device 122 configured to be coupled to Agency computing device 120. In an illustrated embodiment, the card swipe device 122 may be a MiniMag™ compact intelligent magnetic stripe swipe reader available from IDTECH located in Cypress, Calif., the specifications of which are incorporated herein by reference. Illustratively, the card swipe device 122 may be plugged into an USB port of the Agency computing device 120. The card swipe device 122 is programmed to retrieve information encoded in the magnetic stripe on a consumer credit or debit card when the card is swiped and input the information into the GovPayNet web site made available via the Agency computing device 120 through a secure connection over the communication network 106A to the GovPayNet computing device 200. In another embodiment, an iPhone, or other suitable smart phone or PDA equipped with a magnetic stripe reader may be used as an Agency remote computing device 121.

In particular, the present system is intended to expedite the payment of various public obligations by government constituents to an Agency such as property taxes, business taxes, license fees, tuition, medical co-payments, or the payment required for various goods and services provided, as well as penalties assessed by government. The present system and method enables the paying party to make these payments securely through an Agency computer environment other than the computer environment or other payment portal (i.e., POS) of the Agency to which the obligation is owed.

In an illustrated embodiment, the Agency and GovPayNet have an integrated computing environment to enable the Agency and GovPayNet to share files with one another. This enables an Agency to establish a file in a data processing system and communicate it through the Internet or other suitable network 106A supported by an appropriate communication link from the Agency computing device 120 to the GovPayNet computing device 200. The information necessary to establish this file is obtained when the Agency downloads data in batch form to GovPayNet regarding, for example, parcel identification numbers for property tax administration, utility accounts, traffic tickets, or any data that assists GovPayNet in establishing a data base 214 within GovPayNet memory 210 that can expedite the processing of payments.

The downloaded data is illustratively filtered based on various parameters set on the Agency central data processing platform, the GovPayNet central data processing platform, or both. In one embodiment, the data includes information that enables the GovPayNet computing device 200 to further categorize and prioritize individual payments for more efficient handling. Alternatively, the GovPayNet computing device 200 accesses an Agency data base 154 via network 106A to query data not transmitted by the Agency to GovPayNet but instead stored and managed by the Agency.

Figure 4:
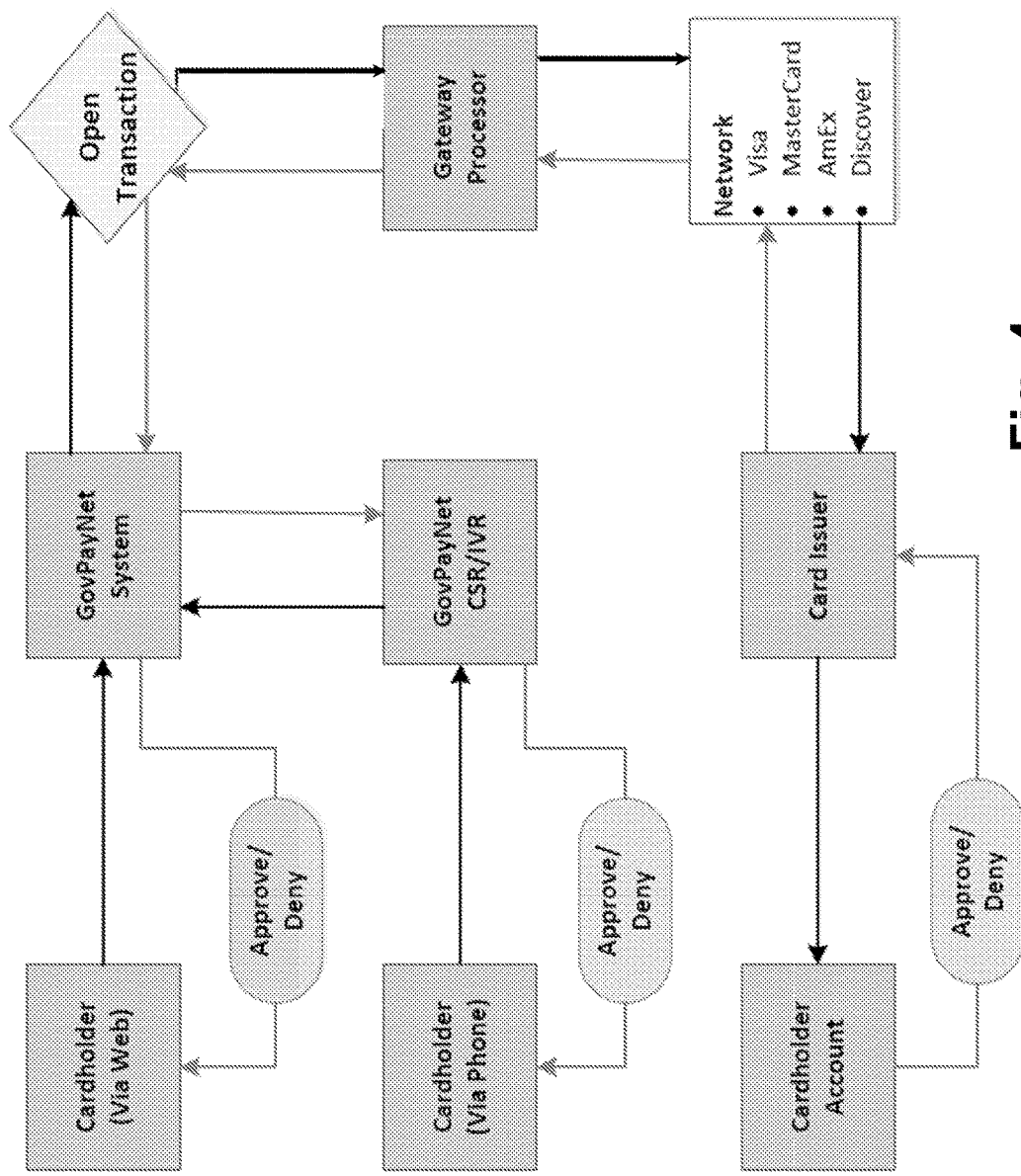
FIG. 4 is a flowchart illustrating steps performed to process a payment after the system and method has been activated.

The GovPayNet computing device then connects via network 106B with a payment authorization processor 300 where the payment is approved or denied, a standard industry process more fully depicted in FIG. 4. If the payment authorization processor 300 denies the payment, this denial message is sent to the GovPayNet computing device 200 then sent via network 106A to the Agency computing device 120 where it is displayed on screen to user 102. If approved, an approval message is sent in the same manner, and user 102 is given the option of printing the online confirmation 310, or providing information enabling user 102 to receive an email confirmation 320, a facsimile confirmation 330, or other confirmation 340, such as via short message service ("SMS"), Twitter, Facebook account, or other telecommunication or social media venue.

Figure 3:
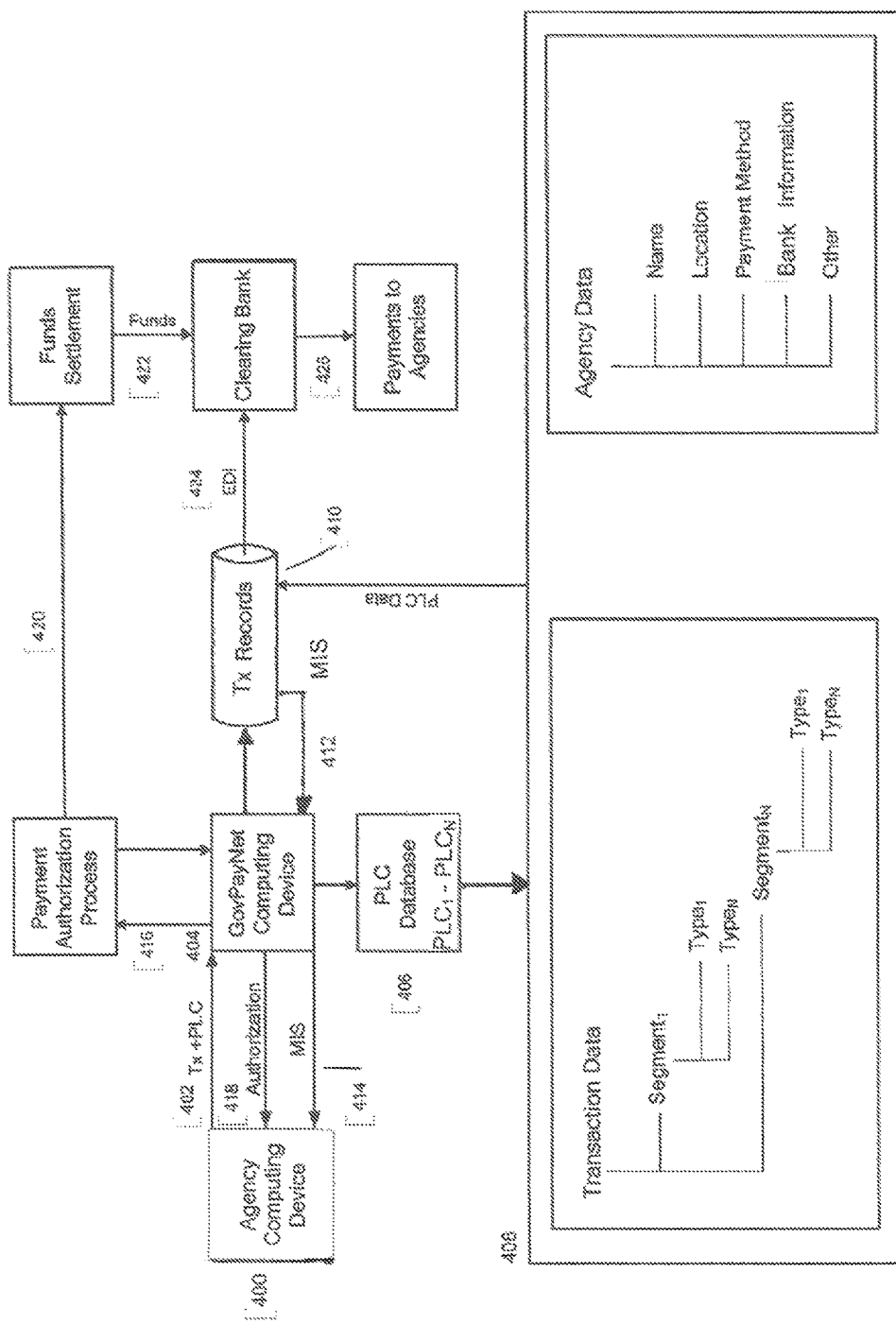
FIG. 3 is a flowchart illustrating steps performed to process a payment involving use of the system and method of the present disclosure.

FIG. 3 depicts how the system and method of the present disclosure is involved in the Transaction, noted by the symbol "Tx" on FIG. 3, and associated processes. At step 400, the consumer initiates the payment process with the assistance of Agency staff (i.e., user 102) whom accesses the Agency computing device via the Agency's web site, a remote computing device that accesses the Agency's web site, or at an Agency location using an Agency computing device with or without an associated card swipe device. Also at step 400, the user completes on behalf or with the assistance of the consumer an Agency-provided selection process to identify the type of payment desired (i.e., property tax payment, utility payment, license renewal fee, parking ticket, bail posting, child support payment, etc.). Key to the functioning of the system and method of the present disclosure is the ability of the user to enter a payment location code ("PLC") containing identifying data, noted by the symbol "PLC" on FIG. 3, that provide further information and instructions in connection with the Transaction being attempted.

PLCs are preprogrammed GovPayNet instructions established for each Agency that activate the system and method of the present disclosure and control GovPayNet system operations with respect to any given Agency. PLCs are established by GovPayNet on its Transaction processing system during Agency service implementation and are contained within a GovPayNet database. A PLC can be thought of as a stock keeping unit ("SKU") identifying specific information in a way that is similar to the SKU identifying a unique product. Agencies may have multiple PLCs in order to process different Transactions. Seasonality, adoption rates and other factors determine the number of active PLCs at any time, though a core number of PLCs is always active on the GovPayNet Transaction processing system.

PLCs are used to differentiate between types of Transactions at an Agency (dog license vs. traffic ticket vs. child support), sub-locations within an Agency (i.e., First District Court vs. Second District Court), and to apply system functionality (i.e., bank routing and account numbers for ACH payments). PLCs are established according to instructions each Agency's management provides to GovPayNet during implementation or modifies through subsequent instructions to GovPayNet from time to time. For Agencies desiring to utilize the system and method of the present disclosure, this instruction is added to the PLCs applicable to that Agency, and all other Agencies participating in that extension of the service.

GovPayNet instructs Agencies to make PLCs assigned to their facilities available to consumers and trains users on their role and importance. The procedure for making a payment to a government agency under contract with GovPayNet can vary, as GovPayNet is increasingly removing PLCs from the consumer and user experience so that they do not have to remember, select or enter a code, as this process is being replaced by a more advanced, flexible and user-friendly web solution, that delivers the PLC to GovPayNet on a basis that is transparent to the consumer and the user. Some instances, however, still require the individual contacting GovPayNet to provide a PLC that Agency staff make available to the consumer for Transaction processing purposes.

Among the information that a PLC conveys to the GovPayNet computing device is the identity of the Agency associated with a Transaction. If the Agency is authorized to accept Transactions on behalf of other Agencies, this capability is encoded in the initiating Agency's own PLC, thus enabling the initiating Agency user to enter or otherwise transmit to GovPayNet, as a part of the Transaction information, the PLC of another Agency that is being served by the system and method through the user's Agency.

At step 402, the Agency computing device accesses the GovPayNet computing device through the Internet (i.e., network 106A) using a secure socket layer ("SSL") communication channel and communicates all Transaction data along with the PLC associated with that Transaction. This initiates a validation process, step 404, in which the GovPayNet computing system confirms that the PLC is valid and that the Transaction is a proper Transaction for that Agency. The GovPayNet system then publishes a series of web forms and screens (as referenced more particularly in FIG. 6 through FIG. 13) in a specific sequence for the entry of additional Transaction-related information, concluding with a confirmation screen that may be printed and given to the consumer as a record of a successful payment. Card data may be entered at this point via the Agency computing device by the consumer, by Agency staff on behalf of the consumer, or by the card swipe device that may be deployed by GovPayNet to the participating Agency for this purpose (as fully described in application Ser. No. 12/982,500).

As threshold actions to the completion of step 404, the GovPayNet computing device employs custom software (GovPayNet applications 212 and management applications 216) for several tasks, including validation of the Agency against information previously encoded to the GovPayNet central data processing system (in database 216).

Step 406 involves the GovPayNet central processing system accessing the GovPayNet PLC Database and associating certain information with the Transaction being attempted, based on the data encoded in the PLC that applies to that Transaction.

Step 408 depicts the population of PLCs and the data they contain in hierarchical format. Both "Transaction Data" and "Agency Data" are associated with the Transaction through the GovPayNet's central data processing system's interactions with this PLC Database. Transaction Data is sorted and applied, first, by payment "segment" represented in FIG. 3 as "segment$_1$" through "segment$_N$." By way of illustration and not limitation, one segment may include the category "criminal justice system payment," another "civil system payment," a third "tax payment," and so on. Each segment is further divided into payment "type" represented in FIG. 3 as "type$_1$" through "type$_N$." A "criminal justice segment payment" at the "type" level may be the posting of cash bail, a restitution payment, payment of an outstanding warrant, payment of an electronic monitoring fee, or some other payment associated with administrative and custody processes in the criminal justice system. A "civil system payment" at the "type" level may be a court fee, license fee, permit fee, tuition, medical co-payment or any other payment associated with satisfying civil obligations or obtaining government-provided goods and services. A "tax segment payment" may similarly be divided into multiple "types" such as real property tax, personal property tax, business occupation tax, franchise tax, or other tax imposed through an Agency upon its constituents. Agency data contained in a PLC consists of the Agency's name, the Agency's location, the types of payments that GovPayNet services for that Agency, the fee that applies to any given payment type, the method through which GovPayNet settles funds owed to the payee Agency upon the completion of a daily payment cycle (automated clearinghouse ("ACH"), wire transfer, check, etc.) and the banking information required to complete a payment (bank routing number and account number for ACH and wire transfer, address for checks, etc.), and other information required for GovPayNet to manage its payment acceptance duties on behalf of the Agency.

Step 410 depicts the GovPayNet central data processing system's establishment of a Transaction record in which all payment details and PLC information is assembled. These Transaction records are the basis for the management information system ("MIS") available to GovPayNet personnel (step 412) and Agency personnel (step 414). GovPayNet MIS enables both Agencies and GovPayNet to generate reports and take various authorized administrative actions with respect to a Transaction.

Upon the completion of the initial Agency and PLC verification and as the various payment data is assembled and initial MIS produced (steps 402 through 414), at step 416, the GovPayNet system initiates the request for authorization from the issuer of the Payment Device (for example, a bank that issued a credit card) to make a payment. The user, having entered all information required for a Transaction. At this point, other GovPayNet applications and databases calculate the fee applicable to the consumer's payment and give the consumer a final opportunity to cancel the payment by publishing this information and option on an updated screen (this is a requirement of Association Rules). GovPayNet then interacts through the appropriate network (network 106B, whether a Card Association network, EFT network or other network) to access the appropriate payment authorization processor (typically a bank that has issued a credit card, debit card, or EFT privileges to the user). If there are insufficient funds available to cover both the payment to the Agency and the fee that the PLC associates with that payment, the payment authorization processor denies the Transaction and this information is reported through the GovPayNet computing device to the Agency computing device and the user so informs the consumer (the GovPayNet system also provides a "Try another card?" option). If sufficient funds exist to cover the payment and the fee associated with the Transaction, but upon review of the payment details including the calculated fee, the consumer decides not to make the payment, the consumer will instruct the user to click a "cancel payment" button and the Transaction is ended. For purposes of illustrating the system and method of the present disclosure, it is assumed that sufficient funds are available to cover the payment amount and the applicable fee, and that the consumer approves the payment. If so, the user clicks a "make payment" button. The payment authorization process is more fully depicted in FIG. 4

At step 418, upon the successful interaction of the GovPayNet central data processing system and the payment authorization processor's central data processing system, the GovPayNet system generates a "Payment Processing Successful" message to the Agency computing device displayed to the Agency user and the consumer. This step provides the user with the opportunity to request a payment confirmation through any of the methods previously described.

The settlement process initiates at step 420. All Transactions approved through use of the system are settled later through an end-of-day settlement cycle. As presently envisioned for the system and method, GovPayNet's and each Agency's systems are integrated in order to permit file sharing and data updates. Therefore, the Agency's system and GovPayNet's system interact to compare transaction details and totals for the concluded processing day, as they would normally in an integrated environment—all other manners of integration between GovPayNet's Transaction processing platform and the Agency, such as cashiering, accounting, reporting, or other systems and data bases, are similarly unaffected by the system and method's operation. The Agency then identifies errors and exceptions to for later resolution, and confirms accurate Transactions to GovPayNet. Separately, the financial institution that authorized the Transaction will have reserved credit or funds on deposit covering Transactions made that day using its cards in sufficient amount to satisfy both the requested payment and the applicable processing fee. For Transactions reported as accurate by the Agency, GovPayNet completes a periodic capture process with the funding banks, and draws from these funds to send payment to the Agency.

Covering funds are transmitted from the card issuing banks to GovPayNet's clearing bank in step 422. Overall, this settlement is completed through an industry-standard process as depicted, in the case of Card Association credit cards or debit cards, in FIG. 5.

At step 424, the GovPayNet computing device and its associated applications and databases act upon the settling funds based on the PLC and other information contained in the Transaction records, transmitting via electronic data interchange ("EDI") the instructions necessary to cause funds to be appropriately distributed to Agencies for which users have directed payments in the processing day. GovPayNet's system causes fees owed to the company to be retained in the clearing account while funds encumbered for user payments to Agencies are transmitted via the method previously identified in the appropriate PLC and communicated to the clearing bank via GovPayNet EDI, concluding the payment process as step 426.

Figure 5:
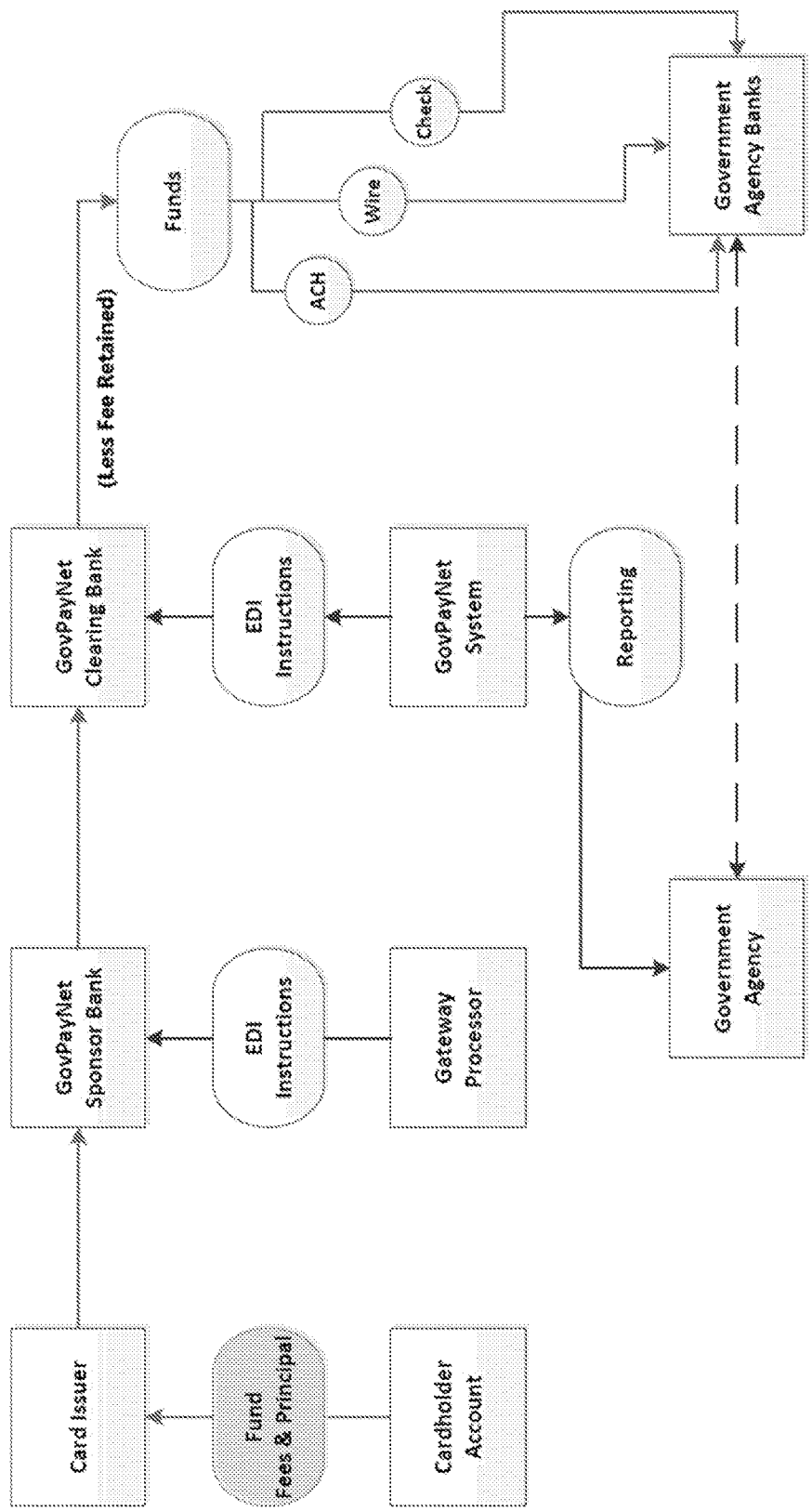
FIG. 5 is a flowchart illustrating funds flow to settle funds to the Agency after a payment has been authorized through use of the system and method.

The electronic payment authorization and settlement processes depicted in FIG. 4 and FIG. 5 are by their nature complicated with many intermediaries playing various processing and telecommunication roles. Each has been simplified to prevent unnecessary complexity.

In general, use of the system and method of the present disclosure begins with a user authenticating with credentials that are provided to the Agency upon service enrollment. Once authentication has occurred, the user will be able to select from any other system-participating Agency using a dropdown list of participating Agencies for which to collect and apply a payment. The user is then directed to user-friendly screens with the customized fields that are validated by the GovPayNet central data processing system to complete the entry of Transaction information. Upon a successful Transaction, funds are routed to the Agency that is intended to receive the payment. It is important to note that, as the system and method of the present disclosure allows one Agency ("Agency A") to accept payment for a second Agency ("Agency B") through utilizing the PLCs associated with Agency B, but funds settlement occurs with Agency B's bank (or with Agency B receiving a check). There is no need for Agency A to transmit funds to Agency B, as would be the case if Agency A accepted a payment directly for Agency B without utilizing the system and method of the present disclosure.

Figure 6:
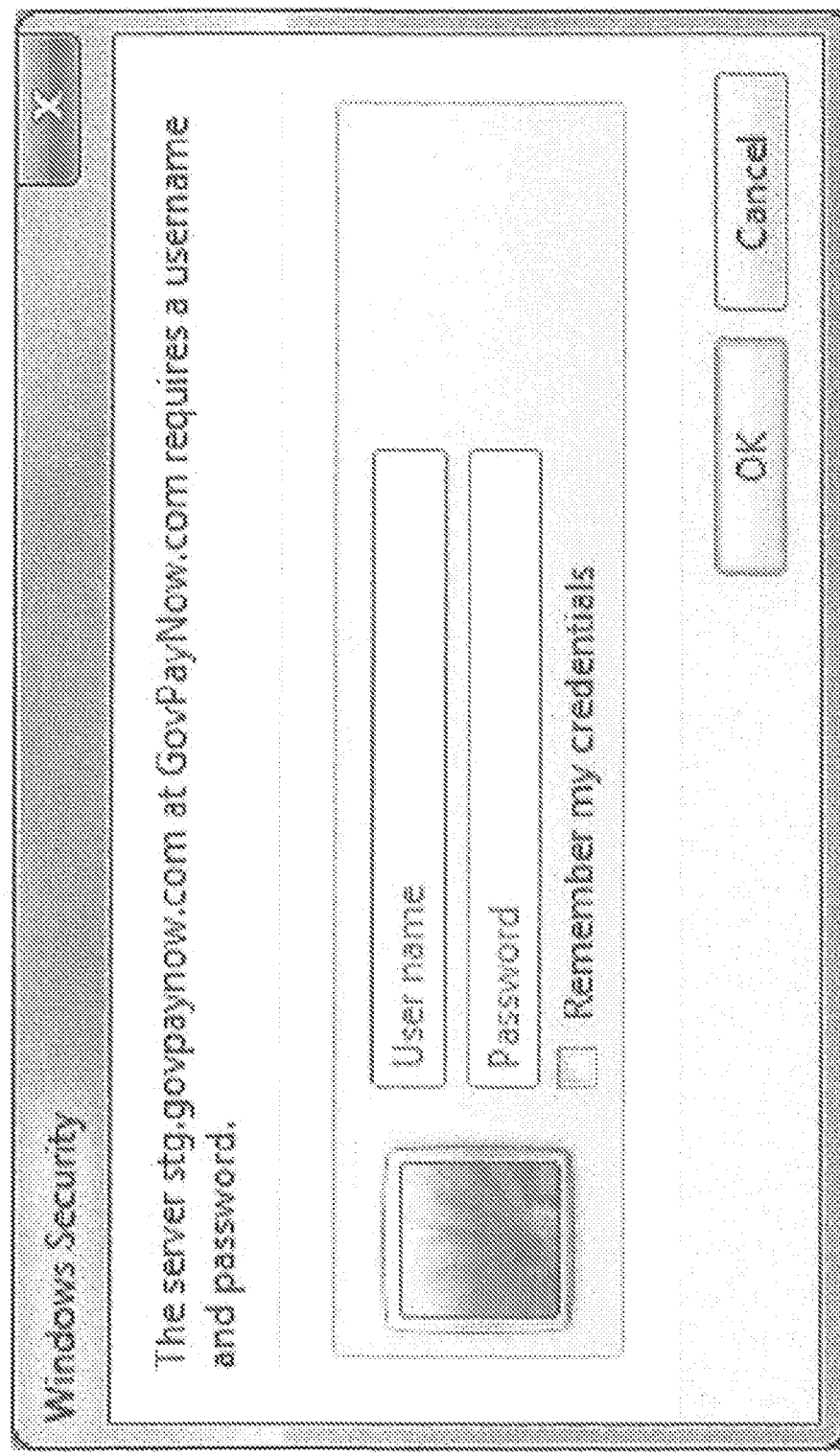
FIG. 6 is a screen shot depicting the initial display and authorizations required to grant the user access to the system and method of the present disclosure.

The Agency user's interaction with the GovPayNet central data processing system for the processing of a payment to another participating Agency begins at FIG. 6. Within the SSL connection, the user is prompted for credentials by the user's web browser. To facilitate a payment, the user must be successfully authenticated and authorized. The user is prompted for credentials every 16 hours.

Figure 7:
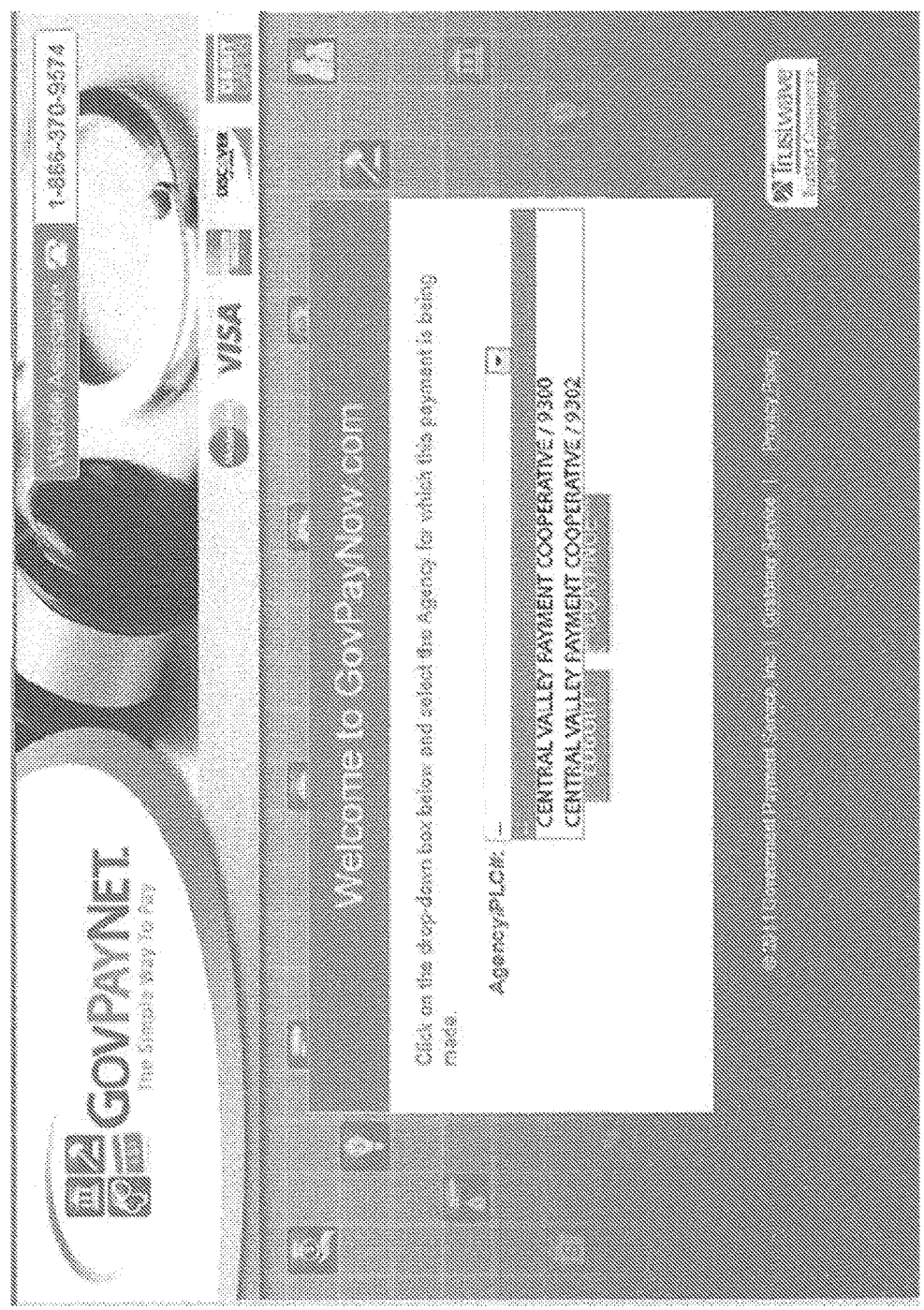
FIG. 7 is a screen shot depicting the home page visible to the user of the system and method of the present disclosure with a user accessing the functions and utilities of the system and method of the present disclosure.

As shown in FIG. 7, once successfully authenticated and authorized, the user is presented with the GovPayNet home page used for the system and method of the present disclosure. This home page allows users to select another Agency and PLC to which they may direct the consumer's payment. Only Agencies and PLCs participating in a GovPayNet program making the system and method of the present disclosure available are visible for selection. The user is offered two options within the home page: continue or logout. If the user chooses to logout, the user is redirected to the generic GovPayNet payment home page, presently shown as GovPayNow.com.

FIG. 7 also depicts a sample selection of PLCs available to the user in a system-customized version of GovPayNow.com. When processing outside of the system and method of the present disclosure, an Agency user does not have the ability to select other Agencies for Transactions.

Figure 8:
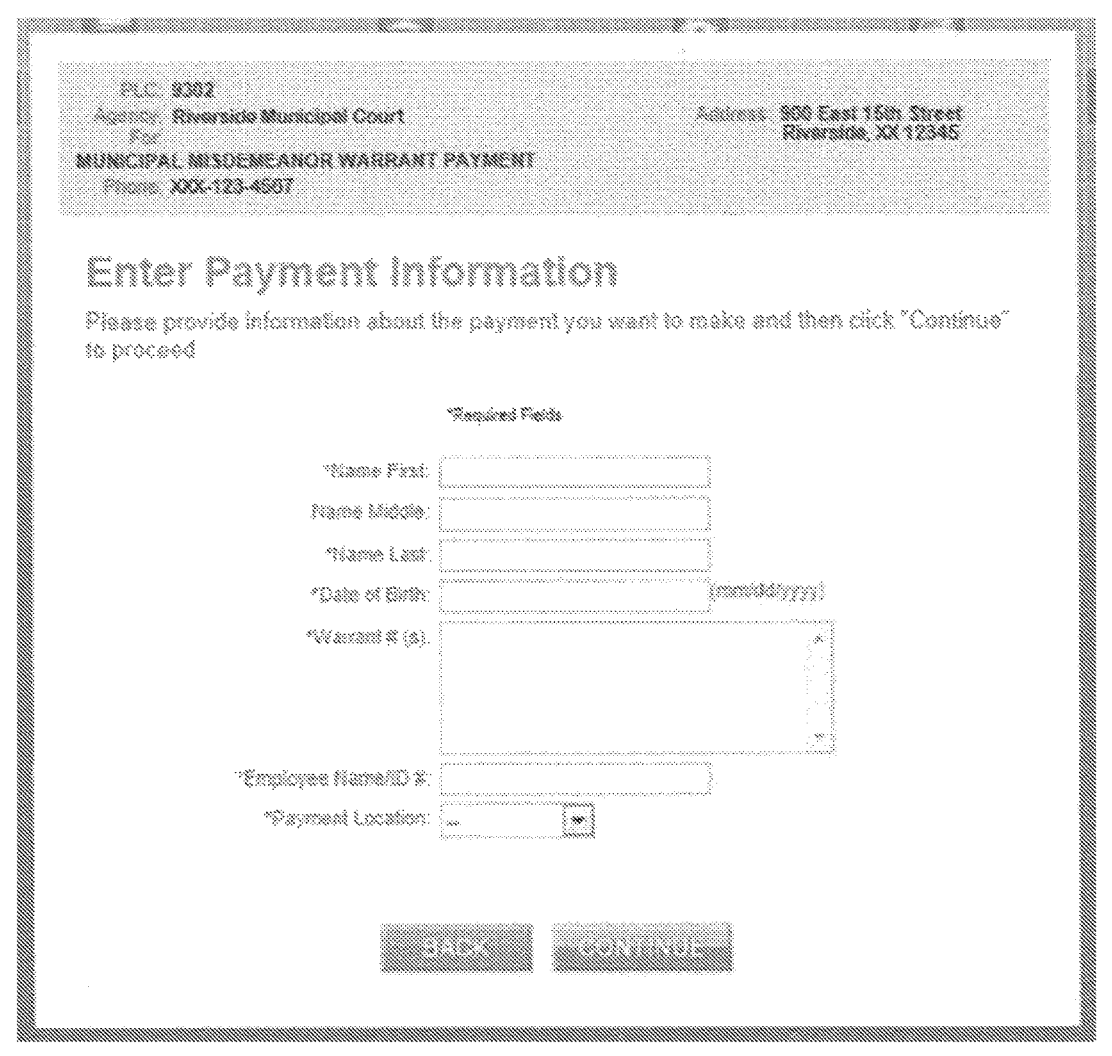

As shown in FIG. 8, once the user has successfully made a choice, the user is then sent to an "Enter Payment Information" page for further Transaction information collection. The payment information page is customized for each Agency and PLC based on its payment information requirements, meaning that an Agency utilizing the system and method may access screens that are customized for the payee Agency for which the user is handling a Transaction.

Figure 9:
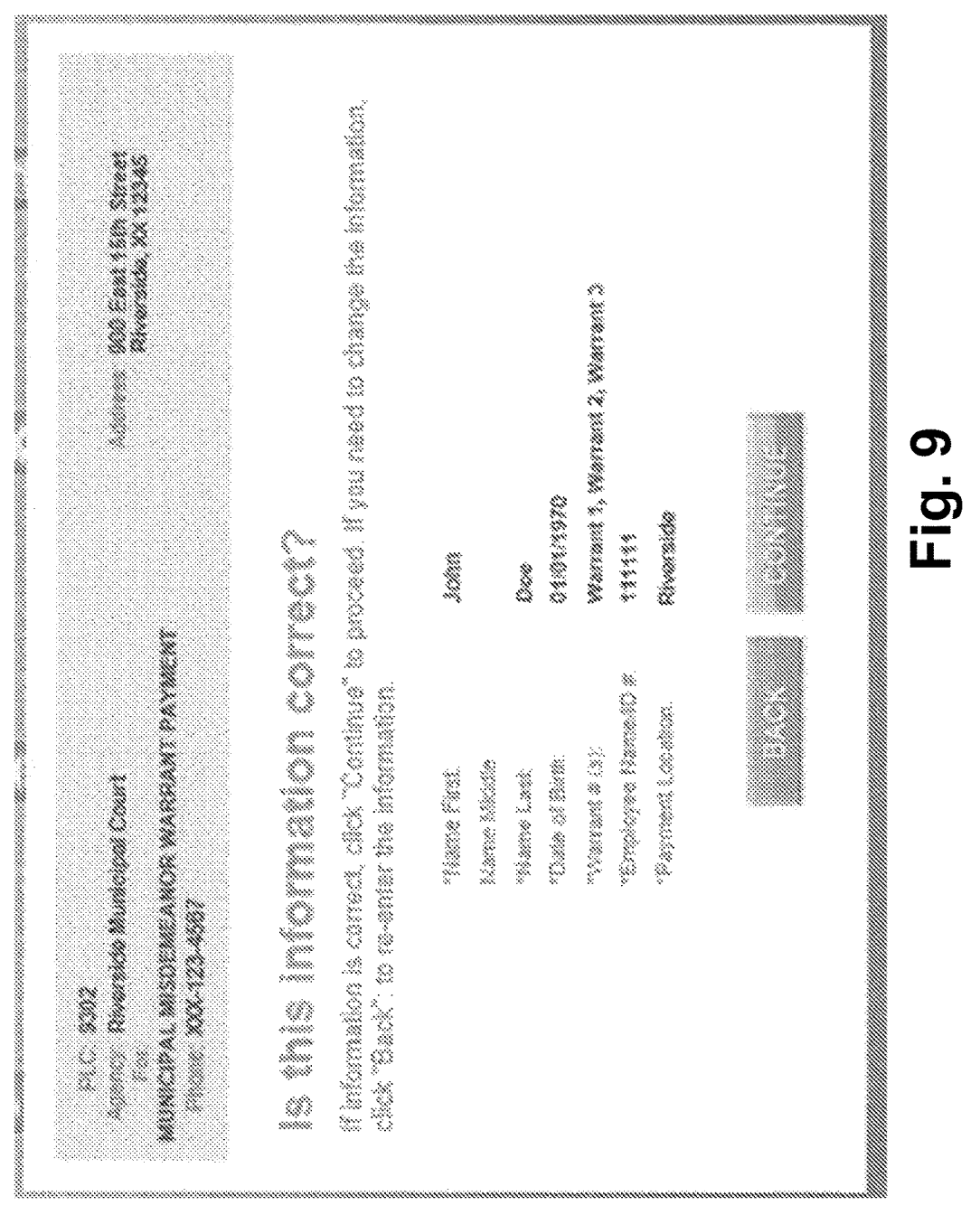

As shown in FIG. 9, the user is prompted to confirm the payment information before proceeding.

As shown in FIG. 10, the user proceeds to enter their payment amount(s). Up to four amounts may be entered, although this is not intended to restrict the operation of the system and method to four amounts—this amount is initially defined to prevent the system and method from being too complex or unwieldy. The payment amounts entered will vary based on the amounts owed to the identified Agency.

Figure 11:
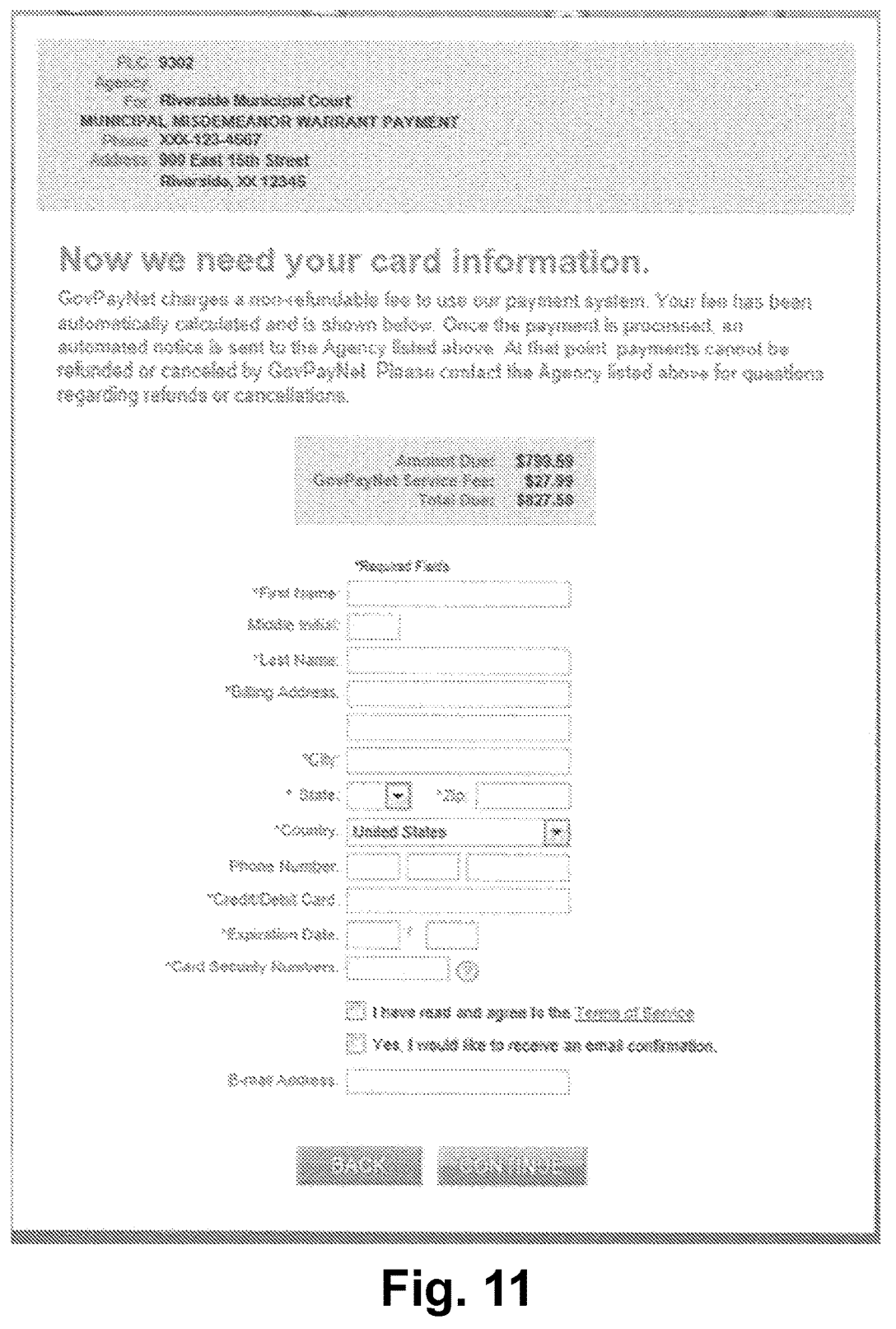

As shown in FIG. 11, the user is then required to enter card account information.

Figure 12:
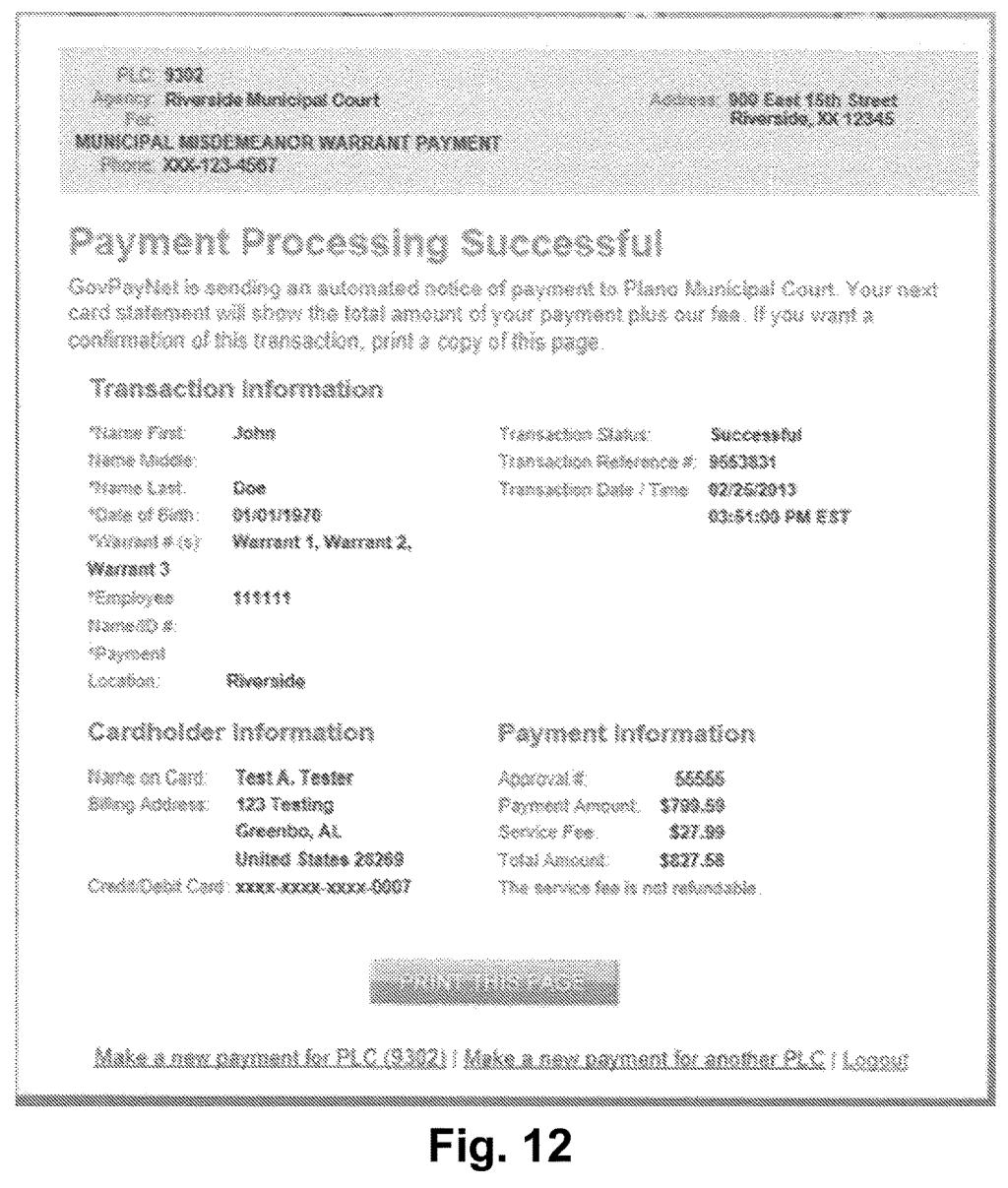

FIG. 12 assumes GovPayNet is able to successfully obtain authorization from the payment authorizing institution; if so, this Transaction summary screen will appear.

Figure 13:
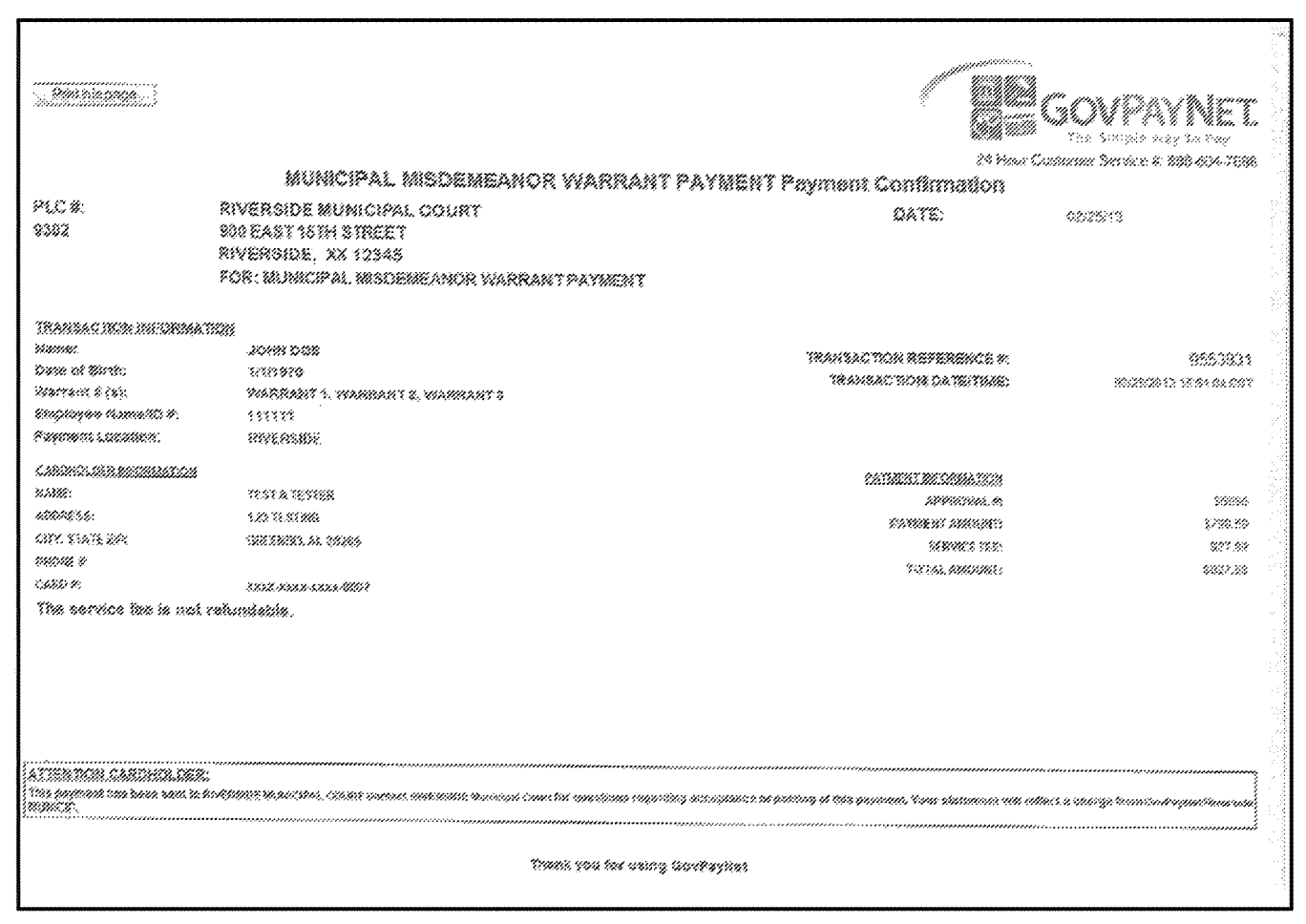

FIG. 13 depicts how a user is empowered by the system and method of the present disclosure to produce a payment confirmation screen that may be printed as a receipt for the consumer. The screen, however, is customized to reflect the payment made to the receiving Agency, not the Agency employing the user. Other embodiments of the system and method of the present disclosure are envisioned such that in addition to print screen confirmation, email, fax, short message service, social media and other forms of confirmation can be made available to the consumer, upon the consumer's provision of required communication information (email address, fax number, SMS, Twitter feed, etc.) to the user.

As shown above, the system and method of the present disclosure is a secure application that allows Agencies to collaborate in their efforts to collect payments on outstanding charges of all kinds, no matter what collaborating Agency is ultimately owed the obligation. The application is fully customizable to the Agencies' needs in regards to the data fields they wish to establish and populate with Transaction information. This system and method is a secured uniform resource locator ("URL") that requires authentication for access. The application is only accessible to authorized users at the Agency level; it is not a public URL, though this is not intended to limit availability of the system and method to the public in future embodiments. The system and method allows for multiple Agencies to collect monies for any charges that any Agency establishes with GovPayNet to be collected through the shared service. This gives Agencies an increased opportunity to collect charges, therefore potentially reducing the amount of charges outstanding and improving cash flow. By establishing multiple Agencies as co-collection points, the system and method also enhances consumer convenience.

As described above, the system and method of the present disclosure is assumed to provide value primarily to Agencies that share borders and services, participate in a purchasing cooperative, are "feeder" Agencies into a central authority, or have other reason to cooperate such as coordinated local law enforcement. For this reason, the system and method of the present disclosure is broadly referred to as a cross jurisdiction payment environment ("CJPE"). Due to the varying reasons Agencies may have to cooperate, GovPayNet anticipates that multiple CJPEs will be deployed among the total customer base of a Processing Company, such as GovPayNet. An additional utility of the CJPE is that by enabling Agencies to accept payments on behalf of other cooperating Agencies, the MIS that applies to any Transaction will be available to any of the Agencies cooperating within a given CJPE regardless of what Agency ultimately collected the funds owed.

This is of particular value to law enforcement. Law enforcement Agencies that apprehend an offender may also be in a shared criminal justice data environment. A routine check of an offender may reveal outstanding fines, fees or warrants in a nearby jurisdiction. These obligations may, however, have recently been satisfied by the offender, but the payment information has not yet been entered into local court records. This can result in an offender being taken into custody erroneously, based on other apparently outstanding obligations, wasting law enforcement resources. In a CJPE, Agencies will have the ability to query the MIS available through GovPayNet to rule out such a situation as GovPayNet updates the payment information contained in Transaction records on a real-time basis, unlike court records, the updating of which may lag behind the payment by several days.

The utility of the CJPE, however, is not limited to Transaction processing and MIS relating to law enforcement. The concept of the "CJPE-participating Agency" can be extended to any public or quasi-public authority that may benefit from shared MIS with respect to whether a public obligation has been satisfied. This may include defining new requirements for the exercise of certain privileges, such as satisfying various public obligations as a condition to the issuance of a license or permit. The use of Payment Devices to satisfy public obligations is an established, yet still growing practice. By encouraging the establishment and enhancing the utility of CJPEs through the present disclosure, CJPEs themselves may become interactive, or able to communicate with other government operations where there is a particular need or service opportunity in doing so. For example, a CJPE consisting of local Agencies may become interactive with a state department of motor vehicles so that prior to issuing a commercial drivers' license, where unpaid traffic tickets can be a barrier to issuance, the applicant may use a Payment Device at the state office to satisfy this local obligation. Such interoperable applications of Payment Devices within government will expedite collections, reduce administrative burdens, and improve convenience for all stakeholders in the government payments process.

The CJPE solution utilizes technology to be distributed via an Internet web browser and server-side software for delivery and execution. At present, utilizing a CJPE requires GovPayNet's and each participating Agency's systems to be integrated in order to permit file sharing and data updates. The Agency will also be required to have a website and the ability to include basic website program code to remotely incorporate the services available through the CJPE.

Generally, GovPayNet provides Transaction processing services that enable Payment Device Holders to use a Payment Device as a method to make payments to various Agencies including courts, law enforcement departments, tax assessors, licensing departments, treasurers, and various public authorities such as schools, hospitals, park districts and others via the Internet. These Agencies will have each contracted with GovPayNet in advance to act as their Processing Company to provide a Transaction processing and acceptance service on the Agency's behalf through GovPayNet systems and utilities. GovPayNet only makes its services available to Agencies that have entered into a GovPayNet Transaction processing service contract, or to Agencies that have entered into contracts with other service providers to which GovPayNet itself is a contracted provider of Transaction processing services. The contracts may make GovPayNet the exclusive method of an Agency's payment acceptance and are generally terminable at will by the Agency, a common feature in government contracts. An Agency under contract with GovPayNet, however, in addition to enabling its stakeholders and constituents to make payments by a Payment Device, gains access to enhanced Transaction processing and related capabilities through GovPayNet technologies including but not limited to the systems and methods described in application Ser. No. 12/982,500 and can gain access to the CJPE as well, if desired.

Payment Device Holders typically execute a Transaction with a GovPayNet-contracted Agency through any of several methods. The Payment Device Holder may directly access the GovPayNet web site and process a payment through the Internet. The Payment Device Holder may telephone GovPayNet toll-free and process a payment either entirely through an Integrated Voice Response ("IVR") unit that interacts with the Internet processing capabilities supporting GovPayNet's web site, through a customer service representative ("CSR") who accesses the same GovPayNet web site that GovPayNet makes available to the public for Transactions, or through the use of an IVR and CSR in combination. The Payment Device Holder may visit the office of an Agency and process a payment using an Agency computing device directly (with or without the assistance of Agency personnel), or through another non-Agency computing device such as a kiosk, notebook or other device with Internet access owned and deployed by GovPayNet or by a third party acting on behalf of GovPayNet. The CJPE as presently envisioned, however, is intended to support web-based Transaction processing initiated through an Agency computing device only, though this is not intended to rule out future embodiments of the CJPE to any other method of Transaction acceptance that GovPayNet now or may in the future provide.

By way of illustration and not limitation, the Transaction types that may be processed through an Agency computing device with the assistance of the CJPE Model, for example, on behalf of a judicial Agency may include, among others:

Civil court case filings
Counter-claims and claims involving third parties
Forcible entry and detainer (eviction)
Garnishments and attachments
Replevin (forced return of property)
Jury demand
Appearances
Summonses and subpoenas
Document storage
Mandatory arbitration
Motions and petitions
Appeals
Judgment recognition and enforcement
Records searches and file copies
Pleadings, motions, appeals and other filings similar to civil litigation
Various other fees and surcharges associated with probate, administrative, family court, bankruptcy, patent, and other specialized proceedings Fines and fees that may be due and payable to an Agency in criminal or quasi-criminal proceedings include, among others:

Felony complaints
Misdemeanor complaints
Business complaints
Petty offense, traffic and minor ordinance violations
Petition to vacate bond forfeiture or failure to appear
Writs of habeus corpus
Fees for supervision, probation and electronic monitoring
Fines, fees, restitution, etc.
Expungement requests
Inmate commissary payments
Cash bail The CJPE is suitable for securely accepting Payment Device Data for many types of non-judicial and non-criminal justice system payments to Agencies, including, among others:

Civil fines and citations
Property taxes
Income taxes
Business taxes
Special assessments
Filing fees
Franchise fees
License fees
Permit fees Document and records fees
Co-payments for medical services
Other public fees (parks, marinas, etc.)
Tuition, books and educational materials
Private-sector applications of the CJPE are also possible.

In an illustrative embodiment of the present disclosure, an Internet-based method is provided for the payment of financial obligations to an Agency enabling parties paying amounts to such Agency by credit card, debit card, prepaid debit card, checking account, brokerage account, similar payment devices or other means of electronic payment as may be developed, such as an Internet currency, to make payment through any Agency or Agencies that have previously agreed to participate in the method, the paying party either making payment in person at or remotely to any Agency participating in the method. The method includes a plurality of Agencies, each with an Agency computing system, participating in the method for the purpose of facilitating the processing of electronic payments and funds transfers from a plurality of paying parties intending to satisfy various financial obligations to such participating Agencies. The method also includes a third-party electronic transaction processing business or similar entity with a central computing system to which each Agency has delegated authority under a contractual arrangement or otherwise to act on behalf of such Agencies in facilitating such payments; information related to such plurality of Agencies stored in the database(s) of the transaction processing entity in the form of codes and instructions, such codes and instructions including, but not limited to information relating to the type of payment, applicable service fees for payment processing, payment conditions and limitations, financial settlement, and other information and instructions required by the transaction processing entity to execute electronic payment requests from paying parties; and a link through an Agency stationary, portable, mobile, or wireless computing device such as a personal computer, laptop, tablet, smartphone or similar device accessing a communication network such as the Internet to connect with the web site of the transaction processing entity.

An introductory web page is generated and delivered by the transaction processing entity's computing device to the Agency computing device, such web page to be used by the paying party to initiate the payment process with respect to any Agency participating in the method from the location of any other Agency participating in the method. A drop-down box, map, search function or other process or system is generated and delivered by the transaction processing entity's computing device to the Agency computing device for the paying party to select the participating Agency or Agencies the paying party intends to receive payment(s).

Payment-oriented web pages with instructions and fields are generated and delivered by the transaction processing entity's computing device to the Agency computing device enabling the paying party to input information relevant to intended payment(s) to the selected Agency or Agencies from the paying party for transmission to the transaction processing entity's central computing device. Instructions and fields provided by the payment web pages generated and delivered by the transaction processing entity's computing device to the Agency computing device permit the paying party to enter amount(s) owed, transaction code(s), and other information the transaction processing entity requires to identify the intended payment(s) and route the intended payment(s) correctly to the Agency(ies) the paying party identifies for receipt of payment. Instructions and fields provided by the payment web pages generated and delivered by the transaction processing entity's computing device to the Agency computing device also permit the paying party to enter the information necessary to identify a payment source such as card or account numbers relating to credit card, debit card, prepaid debit card, checking account, brokerage account, Internet currency account, or similar electronic payment sources, devices, and such other means of electronic payment originating from a paying party's funds provider as may be developed which are capable of use over a communication network such as the Internet, the transaction processing entity's computing device applying codes and instructions stored in the database(s) on the transaction processing entity's computing device to calculate and display to the paying party any fees applicable to processing the payment(s) imposed by or through the transaction processing entity.

The transaction processing entity's computing device applies codes and instructions stored in the database(s) on the transaction processing entity's computing device to display to the paying party any conditions, limitations, disclaimers, or other necessary or advisable information associated with the intended payment(s). A web page generated and delivered by the transaction processing entity's computing device to the Agency computing device provides an opportunity for the paying party to select more than one payment or obligation or more than one Agency from the plurality of Agencies to be made through a "shopping cart" function that will initiate the repetition of instructions and fields to assist the paying party in making additional payment(s) to an Agency and/or to additional selected Agencies.

Another web page generated and delivered by the transaction processing entity's computing device to the Agency computing device provides an opportunity for the paying party to review all items and obligations the paying party has selected for payment, all methods selected for payment, all Agencies to be paid, payment amounts, and related payment fees, separately and in total. Yet another web page generated and delivered by the transaction processing entity's computing device to the Agency computing device provides an opportunity for the paying party to approve the transaction(s) if satisfactory to the paying party, or, if unsatisfactory, providing an opportunity for the paying party to edit the information the paying party has provided until the paying party is satisfied with all details of the proposed transaction(s).

Upon the paying party's positive indication of approval of the transaction(s), the electronic transaction processor's computing device contacting the paying party's card issuer, bank, brokerage, or other funds provider over a communication network to obtain authorization of the transaction or, alternatively, receive from the funds provider the declination of a requested transaction and any reasons therefore (i.e., insufficient credit balance, insufficient funds on deposit, stolen card, frozen account, etc.). The transaction processing entity's computing device communicates over the public communication network back to the Agency computing device and displays to the paying party the approval of the paying party's requested transaction(s) if successful and, if unsuccessful in whole or in part, the reasons therefore.

A web page generated and delivered by the transaction processing entity's computing device to the Agency computing device provides an opportunity for the paying party to re-attempt the unsuccessful transaction(s) or parts thereof using alternate electronic payment means or device(s). Upon the paying party's positive indication, re-initiation of the transaction processing entity's authorization process with respect to such declined transactions, the paying party can attempt to use alternate electronic payment means or devices until such time as the paying party has obtained full approval for the requested transaction(s) or abandoned the effort to complete all or parts of the transaction(s) previously declined by the funds provider.

The transaction processing entity's computing device transmits over the communication network to an Agency's computing device or to a plurality of Agencies the approved payment(s), providing such Agency(ies) an opportunity to manually accept or decline such approved transaction(s). In lieu of the transaction processing entity's computing device transmitting over the communication network to Agency's(ies') computing devices transactions that the Agency(ies) may manually accept or decline, any payment(s) approved by the funds provider may be transmitted without providing an opportunity for such Agency(ies) to decline transactions, each such transaction being considered by the transaction processing entity's computing device as accepted by the Agency(ies).

A web page generated and delivered by the transaction processing entity's computing device to the Agency computing device provides an opportunity for the paying party to obtain confirmation and payment details for the approved and accepted transaction(s) through downloading a confirmation or executing a printable confirmation or requesting confirmation through an email, SMS number, interactive voice response, social media website, or other means of receiving payment confirmation and details generated by the transaction processing entity's computing device. The transaction processing entity's computing device transmits over the communication network to a plurality of Agencies' computing devices information related to approved payment(s) to the Agency(ies) including but not limited to paying parties' names, payment types, payment amounts, the obligations paid, and other information necessary or appropriate to enable each such Agency to properly apply funds related to the approved payments.

While this disclosure has been described as having exemplary designs and embodiments, the present system may be further modified within the spirit and scope of this disclosure and the following claims. Various disclosed features may be used in combination with other disclosed features without implementing the entire disclosed system and method. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A computer-implemented method for the payment of financial obligations to a selected agency from a payment source including at least one of a credit card, a debit card, a prepaid debit card, a checking account, a brokerage account or an electronic payment, through an agency computing device associated with any one of a plurality of participating agencies communicating with a transaction processor computer system via a communication network, the method comprising:

storing information related to the plurality of agencies in a database accessible by the transaction processor computer system, the information including a type of payment, an applicable service fee for payment processing, payment conditions and limitations, and financial settlement information to permit the transaction processor computer system to execute an electronic payment request from a paying party;

generating and providing with the transaction processor computer system for display on the agency computing device a page to permit the paying party to initiate a payment process with respect to a selected agency, and to input information related to an intended payment to the selected agency including information to identify the payment source for transmission to the transaction processor computer system;

calculating with the transaction processor computer system a fee applicable to processing the intended payment and providing for display to the paying party through the agency computing device information related to the calculated fee;

determining with the transaction processor computer system and providing for display to the paying party through the agency computing device applicable conditions, limitations, disclaimers, and instructions related to the intended payment;

generating and providing with the transaction processor computer system for display on the agency computing device a page to permit the paying party to review items and obligations the paying party has selected related to the payment including a payment amount, a method selected for payment, the selected agency, and the calculated fee;

generating and providing with the transaction processor computer system for display on the agency computing device a page to permit the paying party to approve each transaction, or, if unsatisfactory, permitting the paying party to edit the information the paying party has provided;

receiving with the transaction processor computer system an approval from the paying party of the transaction;

responsive to receipt of the approval, contacting with the transaction processor computer system a paying party card issuer, a bank, a brokerage, or a fund provider via the communication network to obtain authorization of the transaction or to receive a declination of a requested transaction and any reasons therefore;

generating and providing with the transaction processor computer system for display on the agency computing device a page displaying to the paying party the approval of the requested transaction if successful and, if unsuccessful in whole or in part, the reasons therefore;

generating and providing with the transaction processor computer system for display on the agency computing device a page permitting the paying party to re-attempt an unsuccessful transaction using an alternate payment form or providing additional or corrected information relating to the intended payment;

responsive to receiving a request from the paying party, re-initiating with the transaction processor computer system the payment authorization process with respect to such unsuccessful transaction;

generating and providing with the transaction processor computer system for display on the agency computing device information regarding an approved payment transaction;

generating and providing with the transaction processor computer system for display on the agency computing device a page to permit the paying party to obtain confirmation and payment details for the approved payment transaction;

generating and providing with the transaction processor computer system for display on the agency computing device information related to the approved payment to the agency including at least a name of the paying party, a payment type, a payment amount, an obligations paid, and information to permit the selected agency to properly apply funds related to the approved payments.

2. The method of claim 1 wherein a link to the transaction processor computer system is opened through a non-agency stationary, portable, mobile, or wireless computing device such as a personal computer, laptop, tablet, smartphone or similar device.

3. The method of claim 1, further comprising obtaining information from a credit card, a debit card, or a prepaid debit card through a card reader/swipe device connected to the agency computing device.

4. The method of claim 3, wherein the card reader/swipe device includes a wireless communication device configured to communicate with the agency computing device.

5. The method of claim 1, further comprising receiving with the transaction processor computer system an electronic payment of each approved payment amount and any additional processing fee through a settlement account.

6. The method of claim 1, further comprising generating a financial settlement with the transaction processor computer system of approved payments to the agency contained in the database of the transaction processor computer system and directing transmission of funds related to the approved payments through the transaction processor computer system to the agency computing device of the selected agency.

7. The method of claim 1, further comprising transferring funds with the transaction processor computer system to a depository account of the selected agency.

8. The method of claim 1, further comprising generating a report with the transaction processor computer system to the plurality of agencies indicating a status of payment requests received and processed on behalf of the plurality of agencies.

9. The method of claim 1, further comprising providing downloadable data through a data portal with the transaction processor computer system regarding a status of a payment request received and processed on behalf of the selected agency.

10. The method of claim 1, wherein generating and providing with the transaction processor computer system for display on the agency computing device a page to permit the paying party to initiate a payment process with respect to a selected Agency comprises generating and providing with the transaction processor computer system for display on the agency computing device at least one of a drop-down box, a map, and a search function to permit the paying party to select the Agency that paying party intends to receive the payment.

11. The method of claim 1, wherein the instructions and fields generated and provided with the transaction processor computer system for display on the agency computing device a payment-oriented page providing instructions and fields to permit the paying party to input information relevant to an intended payment to the selected agency for transmission to the transaction processor computer system an amount owed and identifying information to permit the transaction processor computer system to receive the intended payment and route the intended payment correctly to the selected agency.

12. The method of claim 1, further comprising generating and providing with the transaction processor computer system for display on the agency computing device a page to permit the paying party to select a plurality of payments to be made to a plurality of selected agencies.

13. The method of claim 12, wherein generating and providing with the transaction processor computer system a page for display on the user computing device permitting the paying party to select a plurality of payments to be made to a plurality of selected agencies includes providing a "shopping cart" function initiating the repetition of an online form and instructions for the acceptance from the paying party of information to enable the paying party to make additional payments to additional selected agencies.

14. The method of claim 1, further comprising generating and providing with the transaction processor computer system for display on the agency computing device information to permit the selected agency to manually accept or decline approved payment transactions.

15. The method of claim 1, wherein the approved payment transactions are considered by the transaction processor computer system as accepted by the selected agency.

16. The method of claim 1, further comprising responsive to a request from the paying party for a confirmation and payment details for the approved and accepted transactions transmitting a confirmation from the transaction processor computing system via a printable file, an email, a short message service number, an interactive voice response, a social media website, or similar communication method.

17. A computer-implemented method for the payment of financial obligations to a selected agency by a payment source including at least one of a credit card, a debit card, a prepaid debit card, a checking account, a brokerage account or an electronic payment, through an agency computing device located at any one of a plurality of participating agencies communicating with a transaction processor computer system via a communication network, the method comprising:

a third-party electronic transaction processing business or similar entity with a central computing system to which each agency has delegated authority under a contractual arrangement or otherwise to act on behalf of such agencies in facilitating such payments;

information related to such plurality of agencies stored in the database(s) of the transaction processing entity in the form of codes and instructions, such codes and instructions including, but not limited to information relating to the type of payment, applicable service fees for payment processing, payment conditions and limitations, financial settlement, and other information and instructions required by the transaction processing entity to execute electronic payment requests from paying parties;

a link through an agency stationary, portable, mobile, or wireless computing device such as a personal computer, laptop, tablet, smartphone or similar device accessing a communication network such as the Internet to connect with the web site of the transaction processing entity;

an introductory web page generated and delivered by the transaction processing entity's computing device to the agency computing device, such web page to be used by the paying party to initiate the payment process with respect to any agency participating in the method from the location of any other agency participating in the method;

a drop-down box, map, search function or other process or system generated and delivered by the transaction processing entity's computing device to the agency computing device for the paying party to select the participating agency or agencies the paying party intends to receive payment(s);

payment-oriented web pages with instructions and fields generated and delivered by the transaction processing entity's computing device to the agency computing device enabling the paying party to input information relevant to intended payment(s) to the selected agency or agencies from the paying party for transmission to the transaction processing entity's central computing device;

instructions and fields provided by the payment web pages generated and delivered by the transaction processing entity's computing device to the agency computing device for the paying party to enter amount(s) owed, transaction code(s), and other information the transaction processing entity requires to identify the intended payment(s) and route the intended payment(s) correctly to the agency(ies) the paying party identifies for receipt of payment;

instructions and fields provided by the payment web pages generated and delivered by the transaction processing entity's computing device to the agency computing device for the paying party to enter the information necessary to identify a payment source such as card or account numbers relating to credit card, debit card, prepaid debit card, checking account, brokerage account, Internet currency account, or similar electronic payment sources, devices, and such other means of electronic payment originating from a paying party's funds provider as may be developed which are capable of use over a communication network such as the Internet;

the transaction processing entity's computing device applying codes and instructions stored in the database(s) on the transaction processing entity's computing device to calculate and display to the paying party any fees applicable to processing the payment(s) imposed by or through the transaction processing entity;

the transaction processing entity's computing device applying codes and instructions stored in the database(s) on the transaction processing entity's computing device to display to the paying party any conditions, limitations, disclaimers, or other necessary or advisable information associated with the intended payment(s);

a web page generated and delivered by the transaction processing entity's computing device to the agency computing device providing an opportunity for the paying party to select more than one payment or obligation or more than one agency from the plurality of agencies to be made through a "shopping cart" function that will initiate the repetition of instructions and fields to assist the paying party in making additional payment(s) to an agency and/or to additional selected agencies;

a web page generated and delivered by the transaction processing entity's computing device to the agency computing device providing an opportunity for the paying party to review all items and obligations the paying party has selected for payment, all methods selected for payment, all agencies to be paid, payment amounts, and related payment fees, separately and in total;

a web page generated and delivered by the transaction processing entity's computing device to the agency computing device providing an opportunity for the paying party to approve the transaction(s) if satisfactory to the paying party, or, if unsatisfactory, providing an opportunity for the paying party to edit the information the paying party has provided until the paying party is satisfied with all details of the proposed transaction(s);

upon the paying party's positive indication of approval of the transaction(s), the electronic transaction processor's computing device contacting the paying party's card issuer, bank, brokerage, or other funds provider over a communication network to obtain authorization of the transaction or, alternatively, receive from the funds provider the declination of a requested transaction and any reasons therefore (i.e., insufficient credit balance, insufficient funds on deposit, stolen card, frozen account, etc.);

the transaction processing entity's computing device communicating over the public communication network back to the agency computing device and displaying to the paying party the approval of the paying party's requested transaction(s) if successful and, if unsuccessful in whole or in part, the reasons therefore;

a web page generated and delivered by the transaction processing entity's computing device to the agency computing device providing an opportunity for the paying party to re-attempt the unsuccessful transaction(s) or parts thereof using alternate electronic payment means or device(s);

upon the paying party's positive indication, re-initiation of the transaction processing entity's authorization process with respect to such declined transactions, the paying party attempting to use alternate electronic payment means or devices until such time as the paying party has obtained full approval for the requested transaction(s) or abandoned the effort to complete all or parts of the transaction(s) previously declined by the funds provider;

the transaction processing entity's computing device transmitting over the communication network to an agency's computing device or to a plurality of agencies the approved payment(s) and providing such agency(ies) an opportunity to manually accept or decline such approved transaction(s);

in lieu of the transaction processing entity's computing device transmitting over the communication network to agency's(ies') computing devices any approved payment(s) without providing an opportunity for such agency(ies) an opportunity to decline transactions, each such transaction being considered by the transaction processing entity's computing device as accepted by the agency(ies);

a web page generated and delivered by the transaction processing entity's computing device to the agency computing device providing an opportunity for the paying party to obtain confirmation and payment details for the approved and accepted transaction(s) through downloading a confirmation or executing a printable confirmation or requesting confirmation through an email, short message service number, interactive voice response, social media website, or other means of receiving payment confirmation and details generated by the transaction processing entity's computing device; and the transaction processing entity's computing device transmitting over the communication network to a plurality of agencies' computing devices information related to approved payment(s) to the agency(ies) including but not limited to paying parties' names, payment types, payment amounts, the obligations paid, and other information necessary or appropriate to enable each such agency to properly apply funds related to the approved payments.

18. The method of claim 17, wherein the link to the transaction processing entity's computing device is opened through a non-agency stationary, portable, mobile, or wireless computing device such as a personal computer, laptop, tablet, smartphone or similar device.

19. The method of claim 17, wherein certain information related to a payment that the paying party initiates by credit card, debit card, or prepaid debit card is transmitted to the transaction processing entity's payment web page through a card reader/swipe device connected to the agency computing device.

20. The method of claim 17, further comprising the transaction processing entity receiving daily through a settlement account owned and controlled by the transaction processing entity the electronic payment of the proposed payment amounts and the additional processing fees from a plurality of funds providers having previously approved the paying parties' requested transactions transmitted through the transaction processing entity.

21. The method of claim 17, further comprising a daily financial settlement process whereby the codes, instructions, and information related to the approved payments to agencies contained in the transaction processing entity's computing device's database(s) generate instructions to direct the transmissions of batch payments of the approved payment amounts to each agency identified as having been indicated by a paying party as a payment recipient.

22. The method of claim 17, further comprising a daily or more frequent electronic funds transfer, wire transfer, or similar electronic method of transmitting funds, to a depository account communicated previously to the transaction processing entity by each agency to the transaction processing entity and identified through the code(s) and instructions stored in the database(s) on the transaction processing entity's computing device for the purpose of directing the disbursement of batch payments by electronic method for approved transactions to such agency depository accounts.

23. The method of claim 17, further comprising a daily or more frequent issuance of a check to be mailed through a check fulfillment process to each agency at an address communicated previously to the transaction processing entity by each agency to the transaction processing entity and identified through the code(s) and instructions stored in the database(s) on the transaction processing entity's computing device for the purpose of directing the disbursement of batch payments by check for approved transactions to such agency depository accounts.

24. The method of claim 17, further comprising the transaction processing entity's computing device generating reports to the plurality of agencies indicating the status of payment requests received and processed on behalf of the plurality of agencies.

25. The method of claim 17, further comprised of the transaction processing entity's computing device providing through a data portal downloadable data regarding the status of payment requests received and processed on behalf of the agencies enabling agencies to self-direct the agencies' reporting process.

26. The method of claim 17, wherein the card swipe device includes a wireless communication device configured to communicate with the agency computing device.

27. The method of claim 17, further comprised of application of the method and all variations to the method describe above to facilitate payments to private sector entities.

* * * * *